2,837,583

PRODUCTION OF MONO-ALKYLNAPHTHALENES BY THE INTERACTION OF NAPHTHALENE AND ALKYLBENZENES

Arthur P. Lien, Highland, Ind., and David A. McCaulay, Chicago, Ill., assignors to Standard Oil Company, Chicago, Ill., a corporation of Indiana No Drawing. Application August 20, 1954
Serial No. 451,304

9 Claims. (Cl. 260—671)

This invention relates to the production of 2-ethylnaphthalene. Also, the invention relates to the production of 2-isopropylnaphthalene. More particularly the invention relates to the interaction of naphthalene and either ethylbenzenes, isopropylbenzenes, or secondary butylbenzenes.

Alkylnaphthalenes having the alkyl substituent in the 2-position have become of considerable interest in the chemical industry. Of particular importance are 2-ethylnaphthalene, 2-isopropylnaphthalene and 2-sec-butylnaphthalene. The major product of the alkylation of naphthalene with an olefin is the 1-alkylnaphthalene.

An object of this invention is a process for the production of alkylnaphthalenes wherein the alkyl substituent is in the 2-position. Another object is a process for preparing a 2-ethylnaphthalene. Yet another object is a process for preparing 2-isopropylnaphthalene. A further object is a process for preparing 2-sec-butylnaphthalene. Another further object is a process for preparing di-isopropylnaphthalene and di-sec-butylnaphthalene. Other objects will become apparent in the course of the detailed description.

In the process, naphthalene and ethylbenzene or diethylbenzene are contacted, under substantially anhydrous conditions, with liquid HF and $BF_3$ treating agent. Sufficient liquid HF must be used to form a distinct acid phase and a catalytically effective amount of $BF_3$ is used. Usually about 1 mole of $BF_3$ is used per mole of naphthalene. The contacting is carried out at a temperature between about $-20°$ C. and about $+30°$ C. for a time sufficient to form an appreciable amount of ethylnaphthalenes. 2-ethylnaphthalene and other reaction products are recovered from the HF—$BF_3$ acid phase.

When naphthalene and an isopropylbenzene or a secondary butylbenzene are charged to the process, the contacting is carried out at a temperature between about $-50°$ C. and about $+25°$ C. The corresponding 2-sec-alkylnaphthalene and possibly di-sec-alkylnaphthalene and other reaction products are recovered from the HF—$BF_3$ acid phase.

The charge to the ethylnaphthalene process is: Naphthalene which preferably is substantially pure. The other reactive component is ethylbenzene and/or diethylbenzene. It is preferred to operate with naphthalene and an ethylbenzene of such purity that essentially all of the charge will be dissolved into the HF—$BF_3$ acid phase to form an essentially single homogeneous phase; the hydrocarbons are present either in the form of an HF—$BF_3$ complex or in physical solution.

The charge to the secondary alkylnaphthalene process is, in addition to the naphthalene, either isopropylbenzene or di-isopropylbenzene, sec-butylbenzene or di-sec-butylbenzene or mixtures of mono- and di- having the same alkyl groups. In order to obtain di-sec-alkylnaphthalene products containing the same alkyl groups, it is necessary to charge only one type of alkyl group. The process is a liquid phase operation. It is to be understood that a gaseous $BF_3$ phase may also be present, but it is preferred to operate under conditions of pressure such that essentially no separate gaseous $BF_3$ phase exists.

The process is carried out under substantially anhydrous conditions in order to minimize the formation of $BF_3$ hydrates. Therefore, substantially anhydrous liquid hydrogen fluoride is used, which substantially anhydrous liquid hydrogen fluouride contains not more than about 3% of water. The commercial grade of anhydrous hydrofluoric acid is suitable for use in the process.

Naphthalene and alkylnaphthalenes form a complex with HF and $BF_3$ which is believed to contain 1 mole of $BF_3$ and 1 mole of HF per mole of naphthalene or alkylnaphthalene. In the process, sufficient liquid HF must be present not only to participate in the formation of the complex, but also to dissolve the complex. In general, at least about 3 moles of liquid HF are utilized per mole of naphthalene and alkylbenzene charged. More than this amount may be used, for example, 50 moles or more. It is preferred to use between about 7 and 15 moles of liquid HF per mole of naphthalene and alkylbenzene charged. (It is to be understood that "alkylbenzene" as used herein means one of the defined ethylbenzenes, isopropylbenzenes, and sec-butylbenzenes.)

In addition to the liquid HF there must be present in the contacting zone boron trifluoride in a catalytically effective amount. That is, enough $BF_3$ must be present to catalyze the interaction of naphthalene and the alkylbenzene to alkylnaphthalene and other reaction products. In general, at least 1 mole of $BF_3$ must be used per mole of alkylnaphthalene product which is desired to be produced. More usually, at least about 1 mole of $BF_3$ is used per mole of naphthalene charged. The preferred usage of $BF_3$ is 1 mole per mole of naphthalene and alkylbenzene charged.

The HF—$BF_3$ agent and the charge hydrocarbons are contacted at a temperature such that interaction takes place in a practical length of time. As used herein, interaction involves a transfer of an alkyl group from an alkylbenzene to naphthalene to form a mono-alkylnaphthalene or di-alkylnaphthalene. However, the temperature of operation must not be so high that side reactions and decomposition reactions become the predominant reaction. In the ethylnaphthalene process, the contacting is carried out at a temperature between about $-20°$ C. and about $+30°$ C. Preferably the temperature of contacting is about $15°$ C.

The contacting must be carried on for a time at least sufficient to obtain some interaction product, i. e., alkylnaphthalene. The lower the temperature of contacting, the longer the time necessary. At the higher temperatures, the contacting time must be limited to avoid side reactions and decomposition. In general, in the ethylnaphthalene process over the temperature range of about $-20°$ C. to about $+30°$ C. suitable times of contacting for attainment of substantial yields of ethylnaphthalene are between about 5 minutes and about 12 hours, the longer times corresponding to the lower temperatures. At the preferred temperature of about $15°$ C., a time of about 15 minutes is sufficient.

For the interaction of naphthalene and diethylbenzene, somewhat longer times must be used than for the interaction of naphthalene and monoethylbenzene in order to attain about the same degree of conversion at the lower temperatures. At the higher temperatures, the rate of interaction appears to be about the same.

The naphthalene and ethylbenzene are charged to the contacting zone in a mole ratio of naphthalene to ethyl groups of about 1. That is, a mole ratio of naphthalene to ethylbenzene of about 1 and naphthalene to diethylbenzene of about 0.5. Preferably the mole ratio of naphthalene to ethyl groups is 1. The presence of excess naphthalene due to a mole ratio much in excess of 1 results in an increased yield of naphthalene decomposition product; on the other hand, an excess of ethylbenzene or diethylbenzene results in the conversion of the excess to higher ethylbenzenes such as triethylbenzene.

Surprisingly enough, the interaction of naphthalene and ethylbenzene results in the formation of essentially only the monoethylnaphthalene. At the temperatures of operation, no detectable amount of diethylnaphthalene is formed. It appears to be impractical to operate at conditions of temperature and time to form appreciable amounts of diethylnaphthalene; side reactions and decomposition reactions impose too great a yield penalty.

In the sec-alkylnaphthalene process, it is possible to operate under conditions to obtain essentially only the mono-sec-alkylnaphthalene or to obtain a mixture of mono-sec-alkylnaphthalene and di-sec-alkylnaphthalene. The course of the interaction is determined by a relationship of temperature and time. Operation at a temperature of about −20° C. for a time not in excess of about 30 minutes results in a reaction product mixture containing either isopropylnaphthalene or sec-butylnaphthalene as essentially the only alkylnaphthalene interaction product. Operation at temperatures lower than −20° C. permit longer contacting times while avoiding the formation of the di-sec-alkylnaphthalene product. For example, the process may be operated at about −50° C. for a time of several hours.

However, even at these low temperatures of below about −20° C. prolonged contacting times result in the formation of appreciable amounts of di-sec-alkylnaphthalene. At temperatures above about −20° C. it is difficult to operate at times such that essentially no di-sec-alkylnaphthalene product is formed. The maximum temperature of operation is determined by the increase in side reactions and decomposition reactions; the practical maximum temperature is about +25° C. for the sec-alkylnaphthalene process. In general, over the temperature range of between about −50° C. and about +25° C. suitable times of contacting to obtain appreciable amounts of interaction product are between about 5 minutes and about 12 hours, the longer times corresponding to the lower temperatures. When essentially only the mono-sec-alkylnaphthalene is desired as the alkylnaphthalene interaction product, the preferred temperature is −20° C. and the time is 30 minutes. Di-sec-alkylnaphthalene does not appear to be obtainable as the sole intersection product. The relative yield of mono-sec-alkylnaphthlene and di-sec-alkylnaphthalene can be varied somewhat by adjusting the time and temperature of contacting. However, there appears to exist a limit on the relative distribution of the two alkylnaphthalene interaction products. When it is desired to produce a reaction product mixture containing about the maximum yield of di-sec-alkylnaphthalene, it is preferred to operate at a temperature of about 10° C. for a time of about 15 minutes.

There appears to be no substantial difference in rate of reaction when utilizing di-sec-alkylbenezene as the charge over utilizing mono-sec-alkylbenzene as the charge.

The hydrocarbon reaction product mixture may be recovered from the acid phase by various methods. For laboratory work, the simplest and most suitable procedure consists of adding the acid phase to crushed ice which is maintained at Dry-Ice-acetone temperature. Also, the acid phase may be added to cold aqueous alkaline solution such as sodium hydroxide or ammonia. The use of a cold quenching medium minimizes rearrangement reactions. The hydrocarbons are found as an oil layer above the aqueous layer. The oil layer is then separated by decantation and treated with aqueous alkaline solution to remove occluded HF and $BF_3$.

A more economical procedure is one wherein the HF and $BF_3$ are removed from the acid phase by distillation. In order to avoid side reactions, the distillative removal of HF and $BF_3$ must be carried out at a temperature lower than the maximum tolerable in the contacting zone. The HF and $BF_3$ may be readily removed from an acid phase by vacuum distillation.

EXAMPLES

The results obtainable by the invention are illustrated by several examples set out below. The runs were carried out using a steel reactor provided with a 1725 R. P M. stirrer. The order of addition of materials to the reactor was: (1) A preformed solution of naphthalene and the alkylbenzene, both of technical grade, (2) commercial grade anhydrous liquid HF and (3) commercial grade $BF_3$. The contents of the reactor were agitated during the addition of the HF and $BF_3$; the agitation was continued while the reactor was brought to the desired contacting temperature and maintained during the contacting time. The contents of the reactor were withdrawn into a vessel filled with crushed ice. An upper hydrocarbon layer formed above a lower aqueous layer. The hydrocarbon layer was decanted and washed with dilute ammonium hydroxide solution to remove HF and $BF_3$. The neutral hydrocarbons were water washed to remove traces of ammonium hydroxide.

The reaction product hydrocarbons were fractionated in a laboratory distillation column provided with about 30 theoretical plates. Each product fraction was analyzed by a combination of boiling point, specific gravity, refractive index, and ultraviolet and infrared techniques.

The infrared spectrometry results are considered to be a more reliable indication of the composition of the hydrocarbons than the physical characteristics. This is true because the physical characteristics information on this class of alkylnaphthalenes is relatively unreliable and it is extremely difficult to separate the various isomers.

The naphthalene need not be dissolved in the alkylbenzene. Although the naphthalene is very slightly soluble in liquid HF, the HF—$BF_3$ naphthalene complex is extremely soluble in liquid HF. Agitation of solid naphthalene and liquid HF in the presence of $BF_3$ will eventually result in the solution of the naphthalene into the acid phase as the complex.

Tests were carried out using monoethylbenzene and monoisopropylbenzene. The results of these tests are set out in Table I.

Table I

| Run No. | 1 | 2 |
|---|---|---|
| Charge: (moles) | naphthalene (0.89); ethylbenzene (1.51). | naphthalene (0.98); isopropylbenzene (0.99). |
| Temperature, ° C | 15 | 20. |
| Time, Minutes | 30 | 30. |
| HF, moles | 30.0 | 25.0. |
| $BF_3$, moles | 3.08 | 2.21. |
| N/B, mole ratio(e) | 0.59 | 0.99. |
| HF/N+B, mole ratio | 12.5 | 12.7. |
| $BF_3$/N, mole ratio | 3.46 | 2.26. |
| $BF_3$/N+B, mole ratio | 1.28 | 1.12. |
| Reaction Product Distribution, mole percent: | | |
| Benzene | 42.2 | 30. |
| Alkylbenzene | 4.5 | 8. |
| Dialkylbenzene(a) | 14.0 | 0. |
| Naphthalene | 2.7 | 10. |
| Alkylnaphthalene(b) | 33.6 | 22. |
| Dialkylnaphthalene(c) | 0.0 | 10. |
| Higher boiling(d) | 2.8 | 20. |

(a) 100% 1,3-isomer.
(b) 100% 2-isomer.
(c) Mixture of 2,6- and 2,7-isomers.
(d) Viscous, semi-solid black tar.
(e) N=naphthalene; B=alkylbenzene.

In run 1, wherein naphthalene and ethylbenzene were interacted at 15° C. for a time of 30 minutes, no diethylnaphthalene was formed, within the error of the method of determination. Within the error of the infrared analysis, the diethylbenzene fraction was entirely the 1,3-diethylbenzene isomer; the ethylnaphthalene product fraction was entirely the 2-ethylnaphthalene isomer. This result is completely different from that obtainable with acid-catalyzed olefin alkylation of naphthalene. Even at this fairly moderate temperature, about 3% of a tar believed to be condensation product was found in the reaction product.

In run 2, the charge consisted of naphthalene and isopropylbenzene. In contrast to run 1, no di-isopropylbenzene was found in the reaction product of run 2. Both isopropylnaphthalene and dis-isopropylnaphthalene were found in the reaction product. The isopropylnaphthalene was, within the error of infrared determination, entirely the 2-isopropylnaphthalene isomer. However, the di-isopropylnaphthalene product was found to be a mixture of 2,6-di-isopropylnaphthalene and 2,7-di-isopropylnaphthalene. Although the temperature of operation in run 2 was only five degree higher than in run 1, the yield of tar was almost sevenfold greater. This indicates the greater sensitivity of the secondary alkylnaphthalene process to temperature and time of contacting.

Thus having described the invention, what is claimed is:

1. A process which comprises contacting, under substantially anhydrous conditions, a feed consisting substantially of (a) naphthalene and (b) a member of the class consisting of ethylbenzene and diethylbenzene, with at least about 3 moles of liquid HF per mole of feed and at least about 1 mole of $BF_3$ per mole of naphthalene, at a temperature between about $-20°$ C. and about $+30°$ C. for a time sufficient to form an appreciable amount of ethylnaphthalene and removing HF and $BF_3$ to recover a reaction product mixture containing ethylnaphthalene.

2. The process of claim 1 wherein said feed consists substantially of naphthalene and ethylbenzene and the time is between about 5 minutes and 12 hours, the longer times corresponding to the lower temperatures.

3. The process of claim 1 wherein the liquid HF is between about 7 and 15 moles per mole of feed.

4. The process of claim 1 wherein the $BF_3$ is at least about 1 mole per mole of feed.

5. A process which comprises (1) contacting, under substantially anhydrous conditions, naphthalene and ethylbenzene in a molar ratio of about 1 with between about 7 and 15 moles of liquid HF and about 1 mole of $BF_3$, respectively, per mole of naphthalene and ethylbenzene, at a temperature of about $15°$ C. for a time of about 15 minutes, (2) removing HF and $BF_3$ to recover a reaction product mixture and (3) removing from said mixture an ethylnaphthalene fraction consisting essentially of 2-ethylnaphthalene.

6. A process which comprises contacting, under substantially anhydrous conditions, a feed consisting substantially of (a) naphthalene and (b) a secondary-alkylbenzene selected from the class consisting of isopropylbenzene, di-isopropylbenzene, sec-butylbenzene and di-sec-butylbenzene, with liquid HF in an amount of at least 3 moles per mole of feed and at least about 1 mole of $BF_3$ per mole of naphthalene, at a temperature between about $-50°$ C. and about $+25°$ C. for a time sufficient to form an appreciable amount of sec-alkylnaphthalene and removing HF and $BF_3$ to recover a reaction product mixture containing sec-alkylnaphthalene.

7. The process of claim 6 wherein the time is between about 5 minutes and about 12 hours, the longer times corresponding to the lower temperatures.

8. The process of claim 6 wherein said sec-alkylbenzene is isopropylbenzene and the contacting is carried out at a temperature below about $-20°$ C. for a time of not longer than about 30 minutes and wherein the interaction product consists essentially of 2-isopropylnaphthalene.

9. A process which comprises (1) contacting, under substantially anhydrous conditions, naphthalene and isopropylbenzene in a molar ratio of about 1, with between about 7 and 15 moles of liquid HF and about 1 mole of $BF_3$, respectively, per mole of naphthalene and isopropylbenzene, at a temperature of about $-20°$ C. for a time of about 30 minutes, (2) removing HF and $BF_3$ from a reaction product mixture and (3) recovering from said mixture 2-isopropylnaphthalene as essentially the only interaction product.

References Cited in the file of this patent

UNITED STATES PATENTS

| 2,416,184 | Lee et al. | Feb. 18, 1947 |
| 2,480,939 | Lee et al. | Sept. 6, 1949 |
| 2,528,893 | Lien et al. | Nov. 7, 1950 |
| 2,564,073 | Lien et al. | Aug. 17, 1951 |
| 2,739,991 | Hervert | Mar. 27, 1956 |

OTHER REFERENCES

Berry et al.: "Jour. Am. Chem. Soc.," vol. 49 (1927), pp. 3142–3149.

Zalkind et al.: Chem. Abstracts, vol. 36 (1942), col. 25488.